United States Patent
Conrod

(10) Patent No.: US 9,753,707 B2
(45) Date of Patent: Sep. 5, 2017

(54) CONTEXT-FREE TYPE RECORDING FOR VIRTUAL MACHINES OF DYNAMIC PROGRAMMING LANGUAGES

(71) Applicant: Qualcomm Innovation Center, Inc., San Diego, CA (US)

(72) Inventor: Derek Jay Conrod, San Diego, CA (US)

(73) Assignee: QUALCOMM Innovation Center, Inc., San Diego, CA (US)

(*) Notice: Subject to any disclaimer, the term of this patent is extended or adjusted under 35 U.S.C. 154(b) by 101 days.

(21) Appl. No.: 14/808,150

(22) Filed: Jul. 24, 2015

(65) Prior Publication Data

US 2016/0026446 A1    Jan. 28, 2016

Related U.S. Application Data

(60) Provisional application No. 62/028,926, filed on Jul. 25, 2014.

(51) Int. Cl.
G06F 9/45         (2006.01)
G06F 3/06         (2006.01)
(Continued)

(52) U.S. Cl.
CPC .......... *G06F 8/4434* (2013.01); *G06F 3/0604* (2013.01); *G06F 3/0661* (2013.01);
(Continued)

(58) Field of Classification Search
CPC ... G06F 8/48; G06F 8/71; G06F 8/443; G06F 8/445; G06F 9/45516; G06F 9/45504
See application file for complete search history.

(56) References Cited

U.S. PATENT DOCUMENTS 7,665,079 B1 * 2/2010 Yasue ................. G06F 9/45516
                                                      712/241
8,826,253 B2 * 9/2014 Hernandez Porras .. G06F 8/443
                                                      717/151
(Continued)

OTHER PUBLICATIONS

Kedlaya et al., "NPL—Deoptimization for Dynamic Language JITs on Types, Stack-based Virtual Machines", VEE'14, Mar. 2014, ACM, pp. 103-114; <http://dl.acm.org/citation.cfm?id=2576209&CFID=756630271&CFTOKEN=93748675>.*

(Continued)

*Primary Examiner* — Thuy Dao
*Assistant Examiner* — Ben C Wang
(74) *Attorney, Agent, or Firm* — Neugeboren O'Dowd PC

(57) ABSTRACT

A method and a computing device for reducing deoptimization in a virtual machine are provided. Source code of a dynamically-typed program is compiled. A context-free type-state recorder records a first data type of a value associated with a particular named memory location within the source code. Optimized code may be generated based on the first data type of the value being a matching data type for global values associated with the particular named memory location. One or more global values associated with the particular named memory location may be type-checked. The context-free type-state recorder may record, if one or more of the global values associated with the particular named memory location is a different data type than the first data type, one or more different data types associated with the particular named memory location. New optimized code may then be generated.

18 Claims, 9 Drawing Sheets

(51) Int. Cl.
 *G06F 9/455* (2006.01)
 *G06F 9/44* (2006.01)
(52) U.S. Cl.
 CPC .......... *G06F 3/0673* (2013.01); *G06F 9/4552* (2013.01); *G06F 8/437* (2013.01); *G06F 8/443* (2013.01); *G06F 8/48* (2013.01); *G06F 8/71* (2013.01)

(56) References Cited

U.S. PATENT DOCUMENTS

| | | | | |
|---|---|---|---|---|
| 9,274,931 | B2* | 3/2016 | Bowler | G06F 8/443 |
| 9,459,988 | B2* | 10/2016 | Guan | G06F 11/3624 |
| 9,477,451 | B1* | 10/2016 | O'Farrell | G06F 8/443 |
| 2005/0138611 | A1* | 6/2005 | Inglis | G06F 9/4431 |
| | | | | 717/151 |
| 2014/0189661 | A1* | 7/2014 | Wuerthinger | G06F 9/4552 |
| | | | | 717/139 |
| 2015/0227351 | A1* | 8/2015 | Wuerthinger | G06F 8/443 |
| | | | | 717/139 |
| 2015/0356294 | A1* | 12/2015 | Tan | G06F 8/427 |
| | | | | 726/22 |
| 2015/0378694 | A1* | 12/2015 | Lagergren | G06F 9/45516 |
| | | | | 717/143 |
| 2016/0117157 | A1* | 4/2016 | Stadler | G06F 8/53 |
| | | | | 717/151 |
| 2016/0299746 | A1* | 10/2016 | De | G06F 8/41 |

OTHER PUBLICATIONS

Southern et al., "Overhead of deoptimization checks in the V8 javascript engine", IISWC'16, Sep. 2016, IEEE, pp. 75-84; <http://ieeexplore.ieee.org/stamp/stamp.jsp?arnumber=7581268>.*

Bera et al., "Practical Validation of Bytecode to Bytecode JIT Compiler Dynamic Deoptimization", Journal of Object Technology, vol. 15, No. 2, Feb. 2016, pp. 1:1-26; <http://www.jot.fm/issues/issue_2016_02/article1.pdf>.*

* cited by examiner

```
601 ─ gbl = unknown_value;

602 ─ // r0: unknown_value
     // r9: scratch register

603 ─ // Check that r0 contains a pointer.
     tst  r0,  #1
     beq  deoptimize 604 ─ // Load its type.
     ldr  r9,  [r0, #-1]
     ldrb r9,  [r9, #7]

605 ─ // Check that the type is a string.
     cmp  r9,  #128
     bge  deoptimize 606 ─ // Store value into the cell representing gbl.
     movw r9,  #address of gbl (low half)
     movt r9,  #address of gbl (high half)
     str  r0,  [r9, #3]
```

620

Context-free type
state recorder gbl = string          621

```
607 ─ c_obj.x = unknown_value;

608 ─ // r0: unknown_value
     // r1: c_obj

609 ─ // Check that unknown_value is an integer.
     tst  r0,  #1
     bne  deoptimize 610 ─ // Store value into c_obj
     str  r0,  [r1, #11]
```

630

Context-free type
state recorder c_obj.x = integer
                      631

```
611 ─ arr[10] = unknown_value;

612 ─ // r0: unknown_value
     // r1: arr
     // r2: array index (10)
     // r9: scratch register 613 ─ // Check that unknown_value is an integer.
     tst  r0,  #1
     beq  deoptimize 614 ─ // Store into elements of arr.
     ldr  r9,  [r1, #7]
     add  r9,  r9,  r2 LSL #2
     str  r0,  [r9, #7]
```

640

Context-free type
state recorder arr[10] = integer
                      641

FIG. 6

CONTEXT-FREE TYPE RECORDING FOR VIRTUAL MACHINES OF DYNAMIC PROGRAMMING LANGUAGES

CROSS REFERENCE TO RELATED APPLICATIONS

The present Application for Patent claims priority to Provisional Application No. 62/028,926 entitled "CONTEXT-FREE TYPE RECORDING FOR VIRTUAL MACHINES OF DYNAMIC PROGRAMMING LANGUAGES" filed Jul. 25, 2014, and assigned to the assignee hereof and hereby expressly incorporated by reference herein.

TECHNICAL FIELD

The present invention relates to computing devices. In particular, but not by way of limitation, the present invention relates to compiling or interpreting scripting code.

BACKGROUND

More and more programs are utilizing source code constructs that are written in high level, dynamically-typed programming languages that must be compiled or interpreted before many other activities (e.g., layout calculations, rendering) associated with the constructs can be executed. By way of example, ECMAscript-based scripting languages (e.g., JavaScript® or Flash) are frequently used in connection with the content that they host. One of the most ubiquitous dynamically-typed languages is JavaScript which is run by a JavaScript engine that may be realized by a variety of technologies including interpretation-type engines, profile-guided just-in-time (JIT) compilation (e.g., trace based or function based), and traditional-function-based JIT compilation where native code is generated for the entire body of all the functions that get executed. Other dynamically-typed programming languages can be run by similar engines.

In virtual machines for dynamically-typed programming languages (e.g., JavaScript), performance is largely determined by characteristics of the global type state. Global type state can be thought of as a description of all program behavior and invariants across either a single run of a program or multiple runs. In a statically-typed programming language, global type state includes classes, class members, types of members, parameters, and variables, as well as any other type or structural information expressed explicitly or implicitly in the program source code. Programs written in static languages are usually faster to execute than those written in dynamic languages because type information is fully specified in source code at compile-time, and optimized code is generated based on it. Additionally, since type state doesn't change at run-time in statically typed programs, run-time type checks are not necessary. However, programmers sometimes prefer to use dynamically-typed languages rather than statically-typed languages for several reasons, such as increased flexibility and simplicity. One tradeoff to using dynamically-typed languages is that the aspects of the global type state can change, which makes the compilation of optimized code imprecise, and sometimes wasteful.

In order to generate optimized code for a dynamically-typed language, some type information needs to be known, and several ways of determining type state have been implemented. In a dynamically-typed language virtual machine (VM), global type state can be inferred from program behavior with some analysis that can involve estimation and speculation and with the possibility that the data type of certain variables or other properties can change during program execution. Hence, it is possible to generate optimized code at any point during program execution, but that code may be invalidated when global type state changes. Consequently, the VM must detect when the program deviates from the current global type state using run-time type checks. When a type check fails, the VM must update the global type state by taking the union of the old type state and the new change. Any optimized code dependent on the old type state must be invalidated, and execution must be transferred to non-optimized code. This process, known as deoptimization, is costly in terms of time spent and processing resources used to discard optimized code and generate new optimized code. Deoptimization may happen frequently when a program is starting up until it reaches a fairly complete, steady type state.

Existing virtual machines maintain global type state in a format which is specific to a single run or context of a program. When a short program is run repeatedly, deoptimization is particularly frequent and costly because type state is discarded between runs, and the program may not reach a steady state until it is nearly finished. As dynamically-typed programs become more popular, the current methods of type state analysis and deoptimization will require improvement, and will almost certainly be unsatisfactory in the future.

SUMMARY

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Aspects of the invention may be characterized as a method for reducing deoptimization in a virtual machine. The method may comprise compiling source code of a dynamically-typed program, then recording, at a context-free type state recorder in a memory, a first data type of a value associated with a particular named memory location within the source code. The method may also comprise generating optimized code based on the first data type of the value being a matching data type for global values associated with the particular named memory location, and type-checking one or more global values associated with the particular named memory location is of the same type as the first data type. The method may then include recording, at the context-free type-state recorder, if one or more of the global values associated with the particular named memory location is a different data type than the first data type, one or more different data types associated with the particular named memory location. The method may also include generating optimized code based on the first data type and the one or more different data types of the values associated with the particular named memory location being matching data types for global values associated with the particular named memory location.

Another aspect of the disclosure may be characterized as a computing device for running dynamically-typed programming languages, comprising a compilation engine for compiling source code of a dynamically-typed program and a context-free type state recorder in a memory, configured to record one or more data types of one or more values associated with a particular named memory location within the source code. The computing device may also comprise an optimized code generation component for generating optimized code based on the one or more recorded data types of the value being matching data types for global values associated with the particular named memory location. The computing device may further comprise a run-time type checking component for type-checking one or more global values associated with the particular named memory location to determine whether the global values have matching data types to the one or more recorded data types.

Yet another aspect may be characterized as non-transitory, tangible computer-readable storage medium, encoded with processor readable instructions to perform a method for reducing deoptimization in a virtual machine. The method may comprise compiling, at a compilation engine, source code of a dynamically-typed program, then recording, at a context-free type state recorder in a memory, a first data type of a value associated with a particular named memory location within the source code. The method may also comprise generating optimized code based on the first data type of the value being a matching data type for global values associated with the particular named memory location, and type-checking that one or more global values associated with the particular named memory location is of the same type as the first data type. The method may then include recording, at the context-free type state recorder, if one or more of the global values associated with the particular named memory location is a different data type than the first data type, one or more different data types associated with the particular named memory location. The method may also include generating optimized code based on the first data type and the one or more different data types of the values associated with the particular named memory location being matching data types for global values associated with the particular named memory location.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings in which like or similar elements are designated with identical reference numerals throughout the several views, and wherein:

FIG. 6 depicts several blocks of code and how certain information may be stored in relation to the blocks of code according to several aspects of the disclosure.

DETAILED DESCRIPTION

Various aspects are disclosed in the following description and related drawings to show specific examples relating to exemplary embodiments of a context-free type recorder for virtual machines. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
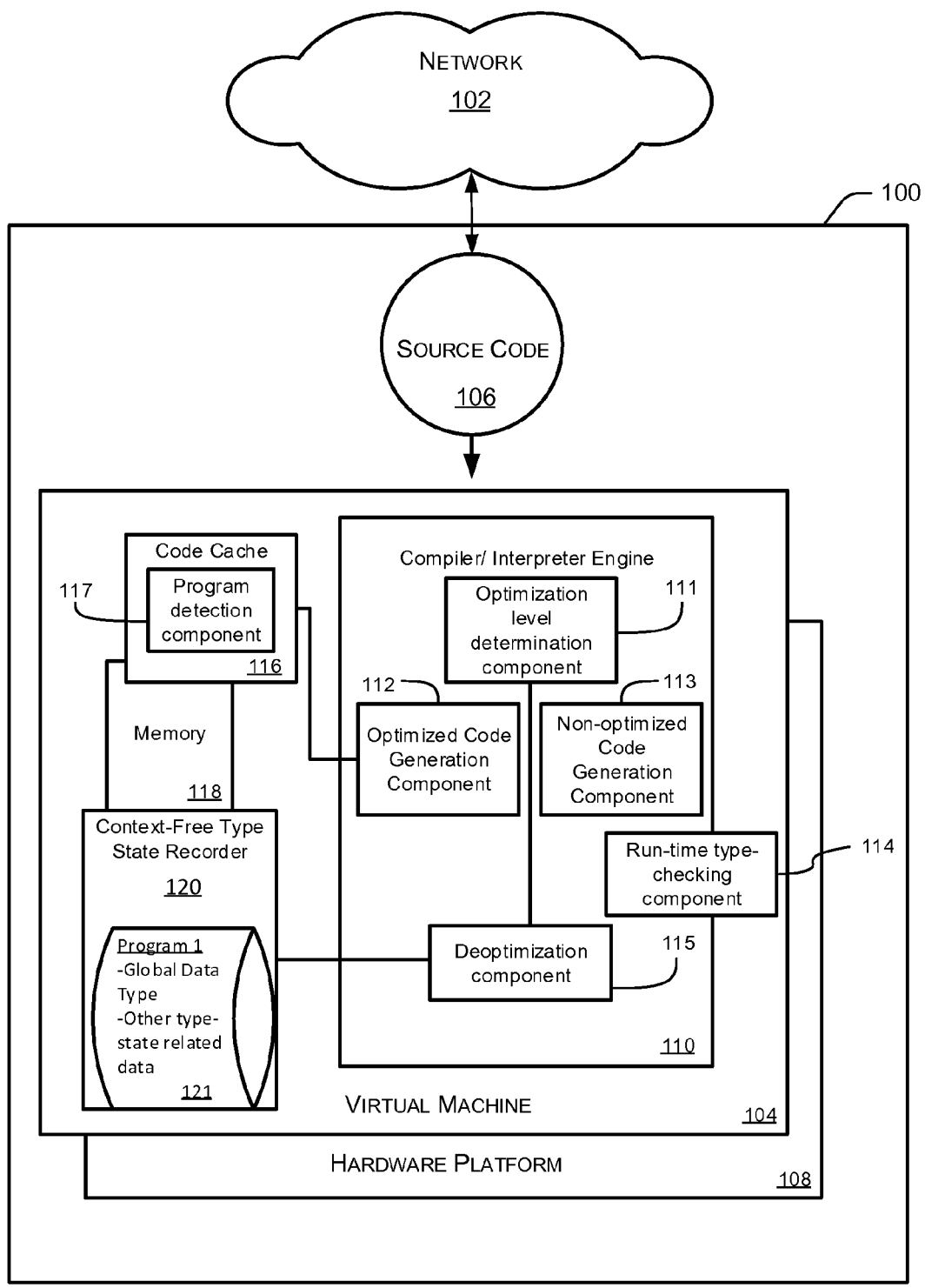
FIG. 1 is a functional block diagram depicting components of a virtual machine that may be configured to perform aspects of the disclosure.

FIG. 1 is a functional block diagram of a computing device 100 and components that may be configured to perform various aspects of the disclosure. As shown, the device 100 is generally configured to communicate via a network 102 to remote web servers or proxy servers (not shown) to receive and display content (e.g., webpages) for a user of the device 100. The device 100 may be realized by a wireless communications device (WCD) such as a smartphone, PDA, netbook, tablet, laptop computer and other wireless devices. But the device 100 may work in tandem with wireline and wireless communication devices. The network 102 may include the Internet, local area networks, cellular networks (e.g., CDMA, GPRS, and UMTS networks), WiFi networks, and other types of communication networks.

As depicted, the device 100 in this embodiment includes a virtual machine 104 that is disposed to receive and process source code 106 so the instructions embodied in the source code 106 may be executed more quickly than prior art virtual machines. The source code 106 is generally in a dynamically-typed language such as JavaScript, LISP, SELF, Python, Perl, or ActionScript. The source code 106 may represent, for example, a website, a program, or an application, or any other computer instructions that may be written in dynamically-typed code. Throughout the disclosure, the source code 106 may be referred to as a "program," but it should be understood that the term "program" can signify any set of computer instructions written in dynamically-typed code. In many embodiments, the source code 106 may be received over a network; for example, the source code 106 may result in the display of a website for viewing documents and other objects, or it may result in the display of a web application (e.g., software-as-a-service). In other embodiments, the source code 106 may reside in a memory of the device 100 itself. For example, it may be a program that resides in non-volatile memory of the device 100. The source code 106 for programs that reside in the non-volatile memory may be received by the virtual machine 104 in a variety of ways, such as through a previous download over the network 102, or through a disk or drive.

The virtual machine 104 in the embodiment depicted includes a compiler/interpreter engine 110. The compiler/interpreter engine 110 may be realized by either a compilation-type engine, an interpreter engine, or a combination of both types of engines. One example of a compiler that may be used in certain embodiments is a HotSpot™ just-in-time (JIT) compiler, which is a compiler for dynamically-typed languages. However, it is contemplated that many kinds of compilation or interpretation engines, or hybrids of the two, may be used in various embodiments without departing from the scope of the disclosure. The compiler/interpreter engine 110 in the embodiment depicted includes an optimization level determination component 111, which, in general, determines the level of optimization of code produced by the compiler/interpreter engine 110. The determination of the level of optimization of code will be discussed in further detail later in this disclosure.

The compiler/interpreter engine 110 also includes an optimized code generation component 112. In some embodiments, the optimized code generation component 112 may be realized by a compiler itself. In general, optimized code is code generated by a virtual machine (VM) that enables a program to run more efficiently, or faster, or with some other preferred characteristics in that particular VM's environment. The optimized code can be mapped to the source code 106 of a particular computer program. When the source code 106 is in a dynamically-typed language, the optimized code can be compiled and executed according to the contents of the source code 106. Optimized code is known in the art, and for the purposes of this disclosure, optimized code may specifically refer to code that is generated based on assumptions about type state information that exists in the source code 106.

Various terms that include the word "type" will be used throughout this disclosure. For the purposes of this disclosure, the terms "global type state," "type state" and "type state information" will be used interchangeably to refer to a broad category which encompasses two specific sub-categories, the first being "global data type" and the second being "other type-state-related data." "Global data type" will be described in more detail presently. "Other type-state-related data" includes "frequency of observed type," "volatility," "run length," and "kind of program," all of which will be described later in this disclosure.

The source code 106 of any program may include many variables, object properties, array elements, and other named memory locations within the lines of code. Each of these named memory locations is associated with, or gets, a value. "Global data type" refers to the data types of the value associated with a particular variable (or object property or array element) across the entire program, or across multiple runs of the program. For the purposes of this disclosure, whenever the term "variable" is used, it may be understood that other named memory locations, such as "object property" or "array element," may be substituted for "variable," unless otherwise indicated. Optimized code based on the source code 106 may assume that each time a particular variable occurs, that particular variable will have an associated value, and that value will be of a certain data type. There are various known primitive data types, including common ones such as integers, strings, booleans, floating point numbers, and characters. The set of objects created using a specific constructor function or class is also a data type. Optimized code can be executed more quickly when the code assumes that a particular variable always gets a particular data type—for example, an integer. The compiler may associate all instances of that particular variable with the data type "integer." It may then omit run-time type checks and make other assumptions based on the type. The "global" aspect of that particular variable refers to the instances of that particular variable occurring in multiple places within one program and instances of that particular variable occurring across multiple runs of the program. Optimized code can be characterized as "highly optimized" or "less optimized" based on how narrow or broad the code's assumptions are. For example, one particular variable in one occurrence within source code could get the integer "0." However, in other occurrences of the same particular variable within the same source code could get a different integer, such as "14," or a different data type altogether, such as a "string." "Highly optimized" code could be generated in which the particular variable is always replaced with "0." "Less optimized" code based on this information could be generated in which the particular variable always gets "integer." Less optimized still would be code in which the particular variable gets "integer or string." Non-optimized code, in comparison, would not make any assumptions about what the particular variable gets.

It may be apparent that in many circumstances, highly optimized code containing very specific or narrow assumptions may not necessarily be advantageous. In the current example, highly optimized code that always replaced the particular variable with "0" would work very well in occurrences where the particular variable does, in fact, get "0." However, when the variable gets "14," or a string, the sections of highly optimized code that always replaced the particular variable with a string would not work at all and have to be thrown out, or "deoptimized." Therefore, in many cases, code may be "less optimized," but more advantageous overall.

Still referring to FIG. 1, the compiler/interpreter engine 110 includes a non-optimized code generation component 113. In some embodiments, the non-optimized code generation component 113 may be realized by an interpreter engine itself. For example, an optimized code generation component 112 may be realized by a JIT compiler and a non-optimized code generation component 113 may be realized by a separate interpreter. Non-optimized code may be used when optimized code is thrown out or is otherwise unavailable or undesired.

The compiler/interpreter engine 110 also includes a run-time type checking component 114. A run-time type checking component may be realized by the compiler/interpreter engine 110 itself. The run-time type checking component 114 can verify that the assumptions made by a particular section of optimized code are correct. In some embodiments, the run-time type checking component 114 can be implemented as code within either optimized or non-optimized code generated by the compiler/interpreter engine 110. Examples of code that verifies the assumptions of optimized code will be described in further detail, and with reference to other figures, later in this disclosure.

The compiler/interpreter engine 110 also includes a deoptimization component 115. The deoptimization component 115 can discard optimized code, instruct the use of non-optimized code, and instruct the generation of new optimized code in the event that the run-time type checking component 114 identifies an error in the global data type assumptions. Typically, in prior art virtual machines, deoptimization is disadvantageous but necessary. Those skilled in the art can appreciate that discarding optimized code can be a waste of processing resources. The extent to which processing resources are used (or wasted) is commonly characterized in the art as "cheap" or "expensive." Additionally, the time spent using non-optimized code and generating new optimized code can negatively impact the performance of the execution of the program. An advantage to embodiments of the present disclosure is that instances of deoptimization can be reduced or eliminated, thereby conserving processing resources and improving program performance.

Still referring to FIG. 1, the VM 104 can include a code cache 116 which has a program detection component 117. The code cache 116 may reside in a memory 118, which may be a volatile or non-volatile memory. The code cache 116 can store optimized code generated by the optimized code generation component 112 for programs that have been previously run on the VM 104. The program detection component 117 can determine whether a particular program has been previously run.

The VM 104 can also include a context-free type state recorder 120. In the embodiment depicted, the context-free type state recorder 120 contains data 121 for an exemplary Program 1, which can include "global type state" and other type-state-related data. The context-free type state recorder 120 will be described in more detail presently.

Figure 2:
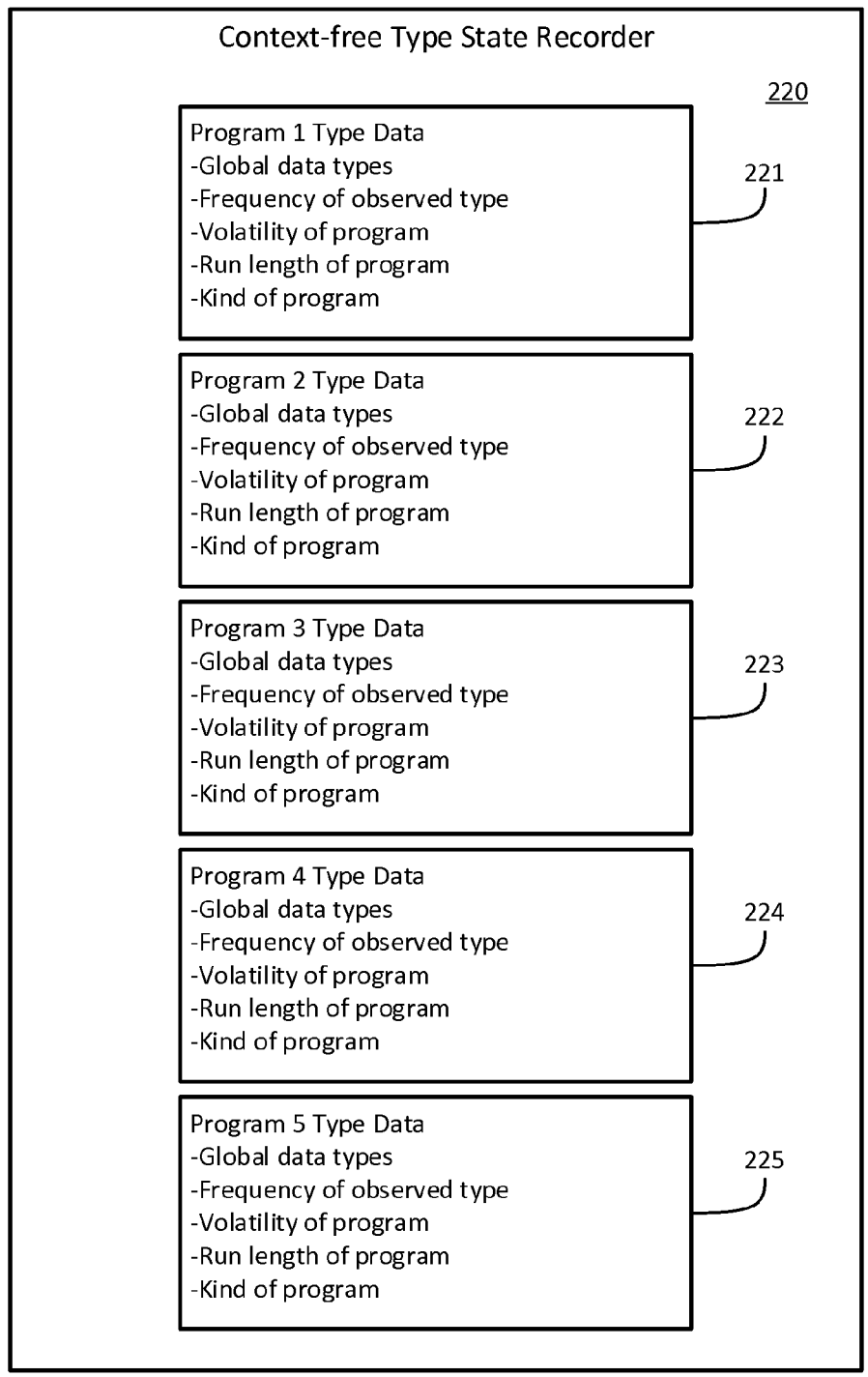
FIG. 2 is a functional block diagram depicting information that may be stored in a recorder according to aspects of the present disclosure.

Turning now to FIG. 2, shown is a diagram depicting the contents of a context-free type state recorder 220 and exemplary lists of data 221-225 for exemplary programs 1-5, respectively. The context-free type state recorder 220 stores at least two categories of "context-free type data," which include the "global data type" and other "type-state-related data" of a program. The global data type of a program can be thought of, for purposes of this disclosure, as a key to all the known data types that exist in the program. In other words, for any particular variables, object properties, array elements, or other named memory locations that may have one or more data types associated with them, the global type state is a collection or index of the possible data types that are associated with the named memory locations. At any given time, the context-free type state recorder may contain the most accurate global type state available to it based on previous runs of the program, or based on recorded type-state data acquired from other VMs. Examples will be used throughout this disclosure to further illustrate the meaning of global type state.

The global data type and the other type-state related data are characterized as "context-free" in that they are not recorded in relation to particular objects within a program or to particular runs of a program. For example, when a program, such as exemplary program 1, runs during a particular instance, it may run some particular objects—for example, objects A, B, and C. The next time program 1 runs, objects A, B, and C may run in a different logical or chronological order, or may not run at all. In order to retain maximum accuracy of the global type state, the global data types and other type-state-related data are recorded without pointing to a particular object. That is, the context-free type state recorder 120 records all possible data types that may be assigned to each variable, object property, array element, etc. across multiple runs of a program, without any limiting characteristics germane to one particular run of the program. An advantage to storing the context-free global type state is that it may be recorded in non-volatile memory and transferred to other VMs. As will be explained further in this disclosure, the context-free global type state may become more accurate when a program has been run on the VM multiple times. When the context-free global type state can be transferred to another VM, the other VM can utilize the data to create highly accurate, highly optimized code on its first run of a program.

The other type-state-related data stored in the context-free type state recorder 220 can include for example, the frequency of observed type, the volatility of the program, the run length of the program, the kind of program, and other heuristics. The type-state-related data can be used to determine the level of optimization of code generated by the compiler/interpreter engine 110, which will be explained in further detail later in this disclosure. The "frequency of observed type" can refer to how often a particular data type appears for a particular variable, object property, or array element, or can refer to how often any particular data type appears throughout the source code. The "volatility" of a program can refer to how often a particular data type assigned to a named memory location changes. Both the frequency of observed type and volatility of a program may be measured in relation to a single run of a program, but the "frequency" and "volatility" data may also change as they continue to be measured across multiple runs of a program. Frequency can be characterized, in one example, as the total number of times a particular data type appears at a particular named memory location. Some programs may have polymorphic code that has multiple cases for multiple types. For these polymorphic codes, frequency can be measured for each of the cases and can be used to sort the cases. Regarding volatility, either the program itself or a particular named memory location may be characterized as having a low, high, or other measurement of volatility. For example, if most named memory locations change data type infrequently after the program has been running for a long time, or after the program has been run many times, the program itself may be characterized as having low volatility. If a particular named memory location, such as a particular variable, changes data type infrequently after the program has been running for a long time, or after the program has been run many times, that particular variable may be characterized as having low volatility.

"Run length" of a program may sometimes be determined during the first run of a program. For programs that run approximately the same way every time, run length may not change across subsequent runs. Many interactive programs, however, may have varying run length, dependent on how long the user has the program open. It may take multiple runs of a program for the context-free type state recorder to record accurate run length data. In contrast, the "kind" of program will likely be apparent upon the first run—whether it is a webpage, a video game, a mobile application, etc.— and that information is not likely to change.

Figure 3:
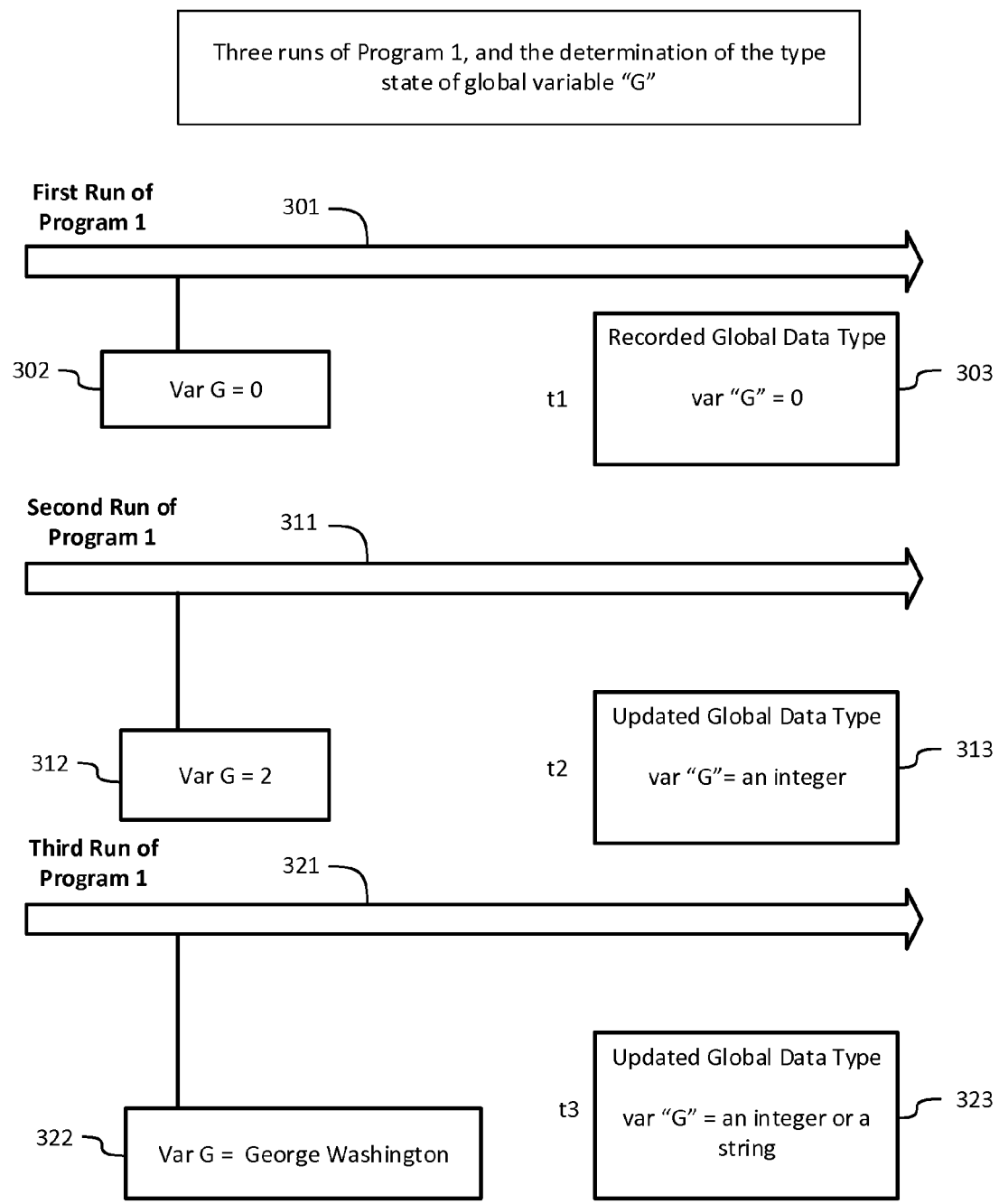
FIG. 3 is a diagram depicting timeline of a program running multiple times and recording different type state information according to an aspect of the disclosure.

Turning now to FIG. 3, shown is a diagram depicting three runs of the same program, "program 1," the determination of the type state of one particular global variable "G," and the recordation of the global data of global variable G. G is referred to as a "global" variable to convey that it exists in multiple runs of a program as variable G, but can get different values and even different data types across the multiple runs.

During the first run of the program 301, the compiler/interpreter engine 110 identifies global variable G at the variable location 302. In this first run, the global variable "G" gets the value 0, represented as "var G=0." Throughout the disclosure, global variables may be abbreviated as "var." This global data type is then recorded in a context-free type state recorder, such as the one depicted in FIG. 1 at 120. In the illustration of FIG. 3, the global type state data is depicted as being recorded in a context-free type state recorder at $t_1$, 303, which can be during the first run 301. During the second run of the program 311, the same global variable G is identified at the second variable location 312. This time, var G=2. This global type state data is then recorded in the context-free type state recorder at $t_2$ 313. Because the first recorded value at 303 for var G was 0, and the second recorded value was 2, the global type state is updated at 313 to reflect the "union" of the two values. That is, they are generalized to their data type, which is that of "integer." To further illustrate the concept of taking the union of (or generalizing) the values or type states, take the example of the third run of the program 321. At the location 322, var G="George Washington," which is a string. Over three runs of program 1, var G has gotten the values of 0 and 2, which are integers, and "George Washington," which is a string. Therefore, the context-free type state recorder at $t_3$ 323 generalizes and records that var G=an integer or a string. An "integer or a string" are recorded data types that encompass the global data type of var G through three runs of program 1.

An advantage to recording the global data type of a particular variable is that optimized code may be generated that relies on accurate assumptions of the data type of that variable. In the example of FIG. 3, optimized code can be generated that assumes that var G is either an integer or a string. In subsequent runs of program 1, var G could have values of "12", or "1,000," or "Abraham Lincoln," and the optimized code would still be valid. Those with skill in the art will appreciate that between the first run 301 of program 1 and the second run 311 of program 1, any optimized code that was generated based on the assumption that variable G=0 would have to be thrown out (deoptimized), and new optimized code would be have to be generated because in the second run 311, var G=2. Because the context-free type state recorder takes the union of the previously recorded value and the current value, it can generalize the values that have a common data type, which in this case, is an integer. If the VM did not generalize the values, like in some prior art VMs, new optimized code might be generated based on the assumption var G=2. If such an assumption were made, any other integers for var G in future runs, including 0, would cause the new optimized code to be thrown out. By generalizing to the common type state, the VM in embodiments of the present disclosure may require less instances of deoptimization. In some embodiments of the disclosure, the context-free type state recorder may automatically generalize to, and record the data type, even after a single run. For example, after the first run 301, where var G=0, the context-free type state recorder may generalize to "var G=integer." Such a generalization may provide the advantage that during the second run 311, when var G=2, the optimized code from the first run 301 will not have to be deoptimized.

Between the second run 311 and the third run 321 of program 1, the optimized code generated based on the assumption var G=integer will have to be thrown out when var G="George Washington" and new optimized code will be generated based on the global data type of var G=an integer or a string. However, after three runs of program 1, the global data type recorded in the context-free type state recorder, and the corresponding optimized code, now accounts for a fairly wide range of values for var=G. That is, it is less likely after three runs that optimized code will have to be thrown out than it was after just one run. After each type state change for a variable, the type encompasses more possible values, since it must cover all previously observed types. After a finite number of steps, a type may become "generic", covering all possible values. For the vast majority of variables, the global data type will reach a fairly steady state before becoming generic, such that it will likely not change in future runs. Of course, it is possible that a rare, new data type for a particular variable may be encountered after multiple runs, but in general, the more runs of a program have taken place on a VM, the more accurate the overall global type state of program is likely to be. Once enough runs of a program have taken place on a particular VM, the global type state recorded in the context-free type state recorder, and the optimized code that is generated based upon that global type state may not require any deoptimization in future runs.

Figure 4:
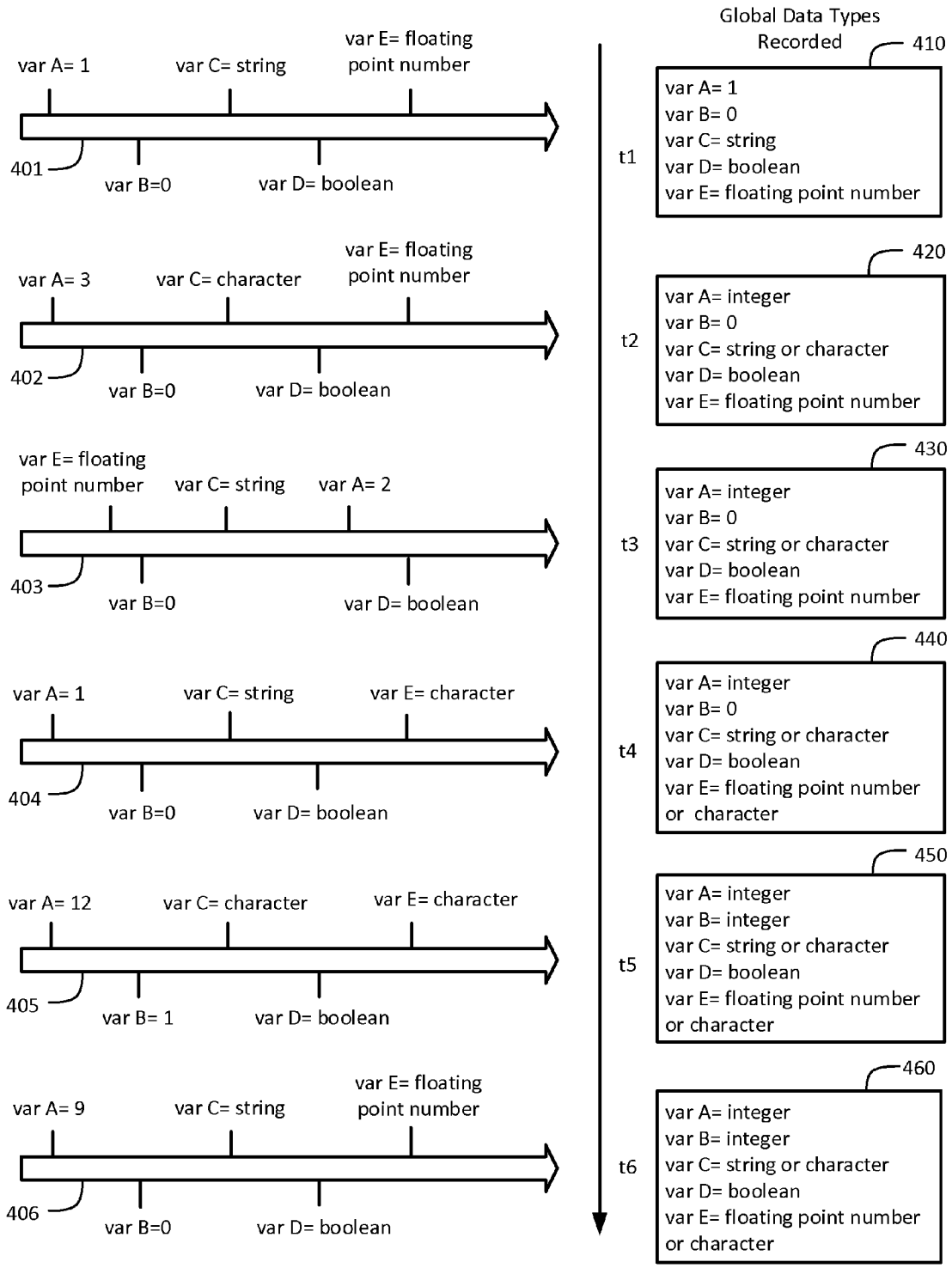
FIG. 4 is a diagram depicting timelines of a program running multiple times and recording type state information for several different variables according to aspects of the present disclosure.

Turning now to FIG. 4, a further example depicting the recording of global data types is shown. Six runs of the same program are represented at the timelines 401-406. Next to each timeline is a corresponding representation of the context-free type state recorder at the time ($t_1$-$t_6$) of each program run. That is, the global type state recorded in the context-free type data recorder at $t_1$ 410 corresponds to the first run 401, the global type state recorded at the context-free type state recorder at $t_2$ 420 corresponds to the second run 402, and so forth. In the first run 401, the global variables A-E are each associated with a particular value or data type. Although in the present example, only global data types for variables are recorded over each run of the program, in other embodiments, global data types for other locations, such as object properties and array elements, may also be recorded. Further details of those embodiments will be discussed throughout the disclosure.

For the first run 401, the recorded values and data types are as follows: var A=1, var B=0, var C=string, var D=Boolean, var E=floating point number. In the embodiment depicted, the global data type recorded at context-free type state recorder ("recorder") at $t_1$ 410 records var A and var B as their actual values (i.e., 1 and 0, respectively), but records var C, var D, and var E as their data types rather than the actual values. This depiction illustrates that in some embodiments an actual value may be recorded, and in other embodiments, the actual value will be automatically generalized into a data type.

In the second run 402, two of the global variables change in relation to the first run 401. The value of var A changes to 3 (from 0 in the first run 401), and var C changes to a character (from a string in the first run 401). The remaining global variables retain the same values and/or data types. As a result, when the global type state is updated in the recorder at $t_2$ 420, var A is generalized to an integer (when it was previously var A=0 at 410) and var C is generalized to a string or character (when it was previously var C=string at 410).

In the third run 403, two of the global variables change again in relation to the second run 402. The value of var A changes to 2 (from 3 in the second run 402), and var C changes to a string (from a character in the second run 402). The global type state recorded in the recorder at $t_3$ 430 remains unchanged from the global type state at 420, because the third run 403 had no variable changes that were incongruent with the global type state at 420. In the depiction of the third run 403, the order of the global variables A-E are arranged on the timeline in a different order than in the first and second runs 401 and 402, respectively. This depiction illustrates the concept that global variables may occur anywhere within a run of a program; that is they may appear in different logical or chronological orders, or as parts of different objects, and in some runs of programs, may not appear at all. The order, or context, in which the variables appear is not relevant to the way the global type state is recorded in the context-free type state recorder. Hence, the recording is "context-free."

For the purposes of clarity, in the fourth run 404 and subsequent runs depicted, the global variables A=–E appear in the same linear order as in the first and second runs 401 and 402. In relation to the third run 403, two more values or data types change for the global variables during the fourth run 404. Var A changes to 1 (from 2 in the third run 403) and var E changes to a character (from a floating point number in the third run 403). As a result, the global data types shown at recorder at $t_4$ 440 is updated only with respect to var E. var E can have the data type of either a floating point number or a character.

In the fifth run 405, the values or data types of three global variable change in relation to the fourth run 404. Var A changes to 12 (from 1 in the fourth run 404), var B changes to 1 (from 0 in the fourth run 404) and var C changes to a character (from a string in the fourth run 404). The changes to var A and var C do not require a change in the global data type recorded for var A and var C in the recorder at $t_5$ 450. However, the change in var B does require that the global data type be updated for var B from var B=0 to var B=an integer.

In the sixth run 406, var A, var B, var C, and var D all change from the values or data types in the fifth run 405. However, each change of value or data type for each variable still fits within the global data type previously recorded at 450, therefore, no new global data type needs to be recorded. Correspondingly, no optimized code generated from the global data types at recorder at $t_5$ 450 would need to be deoptimized during the sixth run 406.

Though the example in FIG. 4 depicts six runs of a program before no further changes needed to be recorded in the global data types, the actual number of runs of a program that may be needed to reach a steady, reliable, or accurate global type state may vary greatly. In many cases, a very accurate global type state may be recorded after only one run of a program. For some programs, a steady state may not be achieved until after many runs of a program. For some programs, how quickly a global type state is achieved may depend on how a user uses a program. For example, if an application has 100 possible features, but a user only ever uses five of the features, the VM may record very accurate global data types for the code used to implement the five features. However, the global data type for a particular variable may change if, after many runs of the program using only five features, the user starts to use some of the other 95 features.

Furthermore, though the example in FIG. 4 depicts a simple scenario in which global data types are recorded only for five global variables, in actual embodiments, global data types may be recorded for any number of variables, object properties, arrays, and other locations. In some embodiments, global data types may be recorded for thousands or millions of locations.

Figure 5:
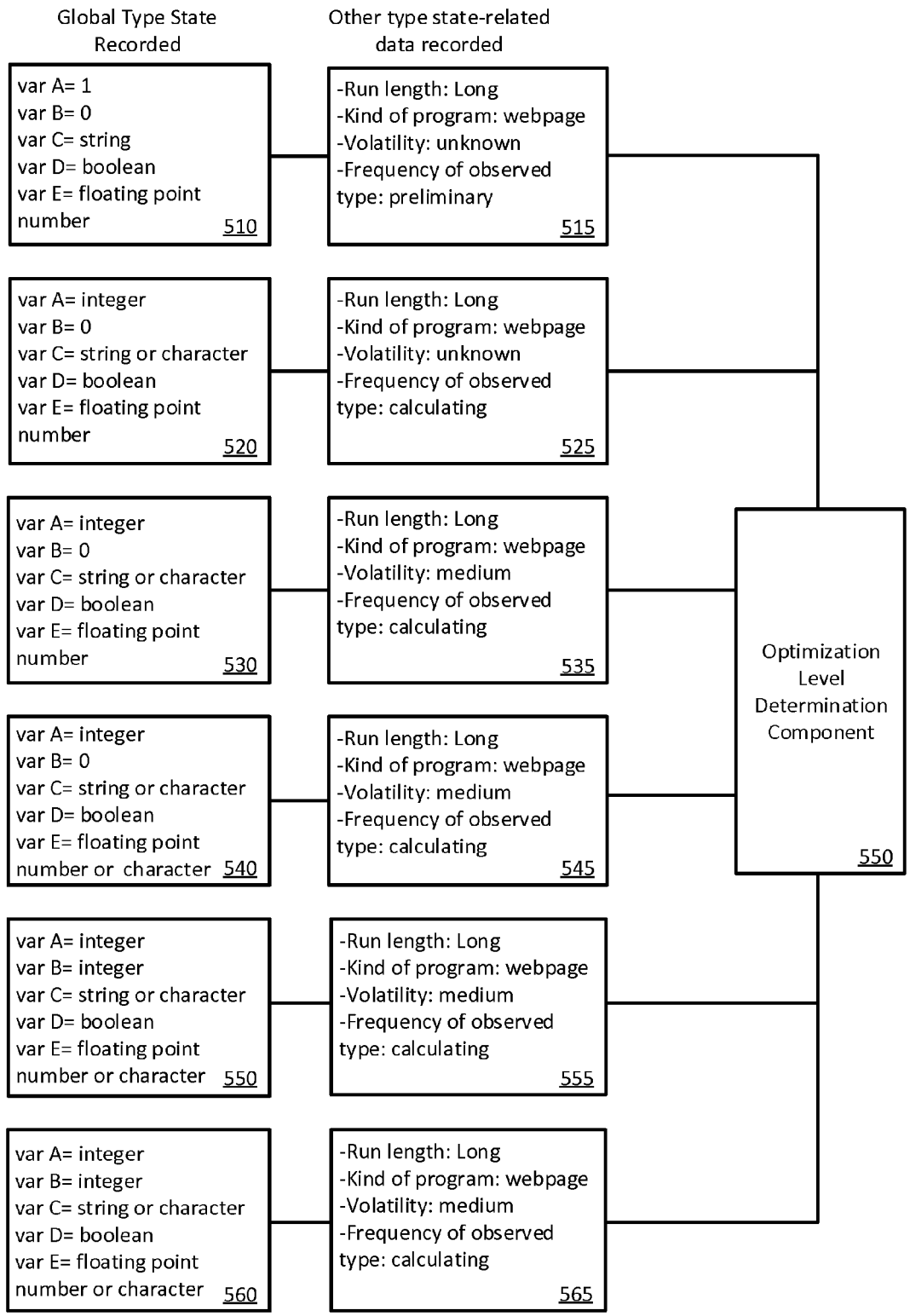
FIG. 5 is a diagram depicting information that may be stored in a recorder according to aspects of the present disclosure.

Apart from the global data types themselves, the context-free type state recorder also records other type-state-related data. In FIG. 5, the global data types recorded at tables 510, 520, 530, 540, 550, and 560 correspond to the global data types recorded at 410, 420, 430, 440, 450, and 460 of FIG. 4, respectively. The other type-state-related data that may be recorded is represented in tables 515, 525, 535, 545, 555, and 565, which may correspond to the global type state data represented at 510, 520, 530, 540, 550, and 560, respectively. These tables are representations of data that may be recorded in a context-free type state recorder, such as context-free type state recorder 120 of FIG. 1. The depiction of the other type-state-related data separately in tables is for the purposes of illustration only, and should not be construed to mean that such data is necessarily stored separately or linearly in relation to the global data types. The global data types shown at tables 510, 520, 530, 540, 550, and 560, and the type-state-related data shown at tables 515, 525, 535, 545, 555, and 565 may both be stored in a context-free type state recorder at any given time.

In the table at 515, four items of type-state-related data are recorded. First is the run length. For this particular program (e.g., program 1 from FIG. 4), the run length is recorded as "long." It is contemplated that the characterization of run length may be general, such as "long," "medium," or "short," or very specific and quantitatively measured in various embodiments. An aspect of the disclosure is that the type-state-related data may provide valuable information to help determine the ideal level of optimization of code generated by the compiler/interpreter engine (such as compiler/interpreter engine 110 in FIG. 1). As an example, if the run length of a particular program is long, the VM could determine that the code should be less optimized because there is a high likelihood of changing global type states, and therefore a high risk of deoptimization over the length of the program. Conversely, the long run length, in conjunction with other type-state-related data, could lead the VM to increase the level of optimization for other reasons. It is contemplated that the run length of a program can be characterized accurately during the first run of any given program, and that characterization may not change over the subsequent runs. Therefore, the run length remains recorded as "long" in tables 525, 535, 545, 555, and 565. However, it is also contemplated that for interactive programs, the run length may vary according to user input, and therefore the recording of the run length may also vary.

The next item of type-state-related data in the table at 515 is the kind of program, which is characterized as a "webpage." The kind of programs that may be recorded in this item of type-state related data may be any of the kind enumerated throughout this disclosure, such as a video game, a web application, a mobile application, a document viewer, or any other kind of computer program. Though the characterization of the kind of program in this example is in a layperson's term of "webpage," it is contemplated that the type-state-data recorded about the kind of program may exist in a variety of technical or lay terms. Like the run length, the kind of program may be characterized accurately during the first run of any given program, and that characterization may not change over the subsequent runs. Therefore, the kind of program remains recorded as "webpage" in tables 525, 535, 545, 555, and 565.

The next item of type-state-related data in the table at 515 is the "volatility" of the program. Volatility, as stated earlier in this disclosure, may refer to the likelihood that aspects of the global type state may change over a single long run of a program, or multiple runs of a program. The volatility of a program may be related to the next item of type-state-related data, which is "frequency of observed type." The frequency of observed type may also refer either to frequencies observed over a single run of a program or across multiple runs, or to both kinds of frequencies. In the table at 515, the volatility of the program is characterized as "unknown," because in the embodiment depicted, volatility is determined after multiple runs of a program, and is therefore unknown after the first run. The frequency of observed type at the table 515 is characterized as "preliminary" because in the present embodiment, some aspects of frequency are known after the first run, but some are still to be determined over subsequent runs.

Accordingly, the volatility of the program is recorded at the table 525 as "unknown" after two runs, but then is recorded as "medium" in tables 535, 545, 555, and 565 after runs three, four, five, and six, respectively. The recording of a volatility characterization as "medium" after the third run illustrates the concept that the volatility of a program may be calculated after several runs of a program. However, in some embodiments, multiple runs may not be necessary to accurately characterize volatility. Conversely, in other embodiments, far more runs of a program may be necessary to accurately characterize volatility. Additionally, the assessment of volatility may change over multiple runs and be updated in the context-free type state recorder, even though in the tables at 535, 545, 555, and 565, volatility remains characterized as "medium." It is contemplated that volatility may be characterized and recorded more precisely than in the terms depicted in FIG. 5. Volatility may be characterized, calculated, assessed, or recorded using specific measurements, or be described by any kind of technical or lay terms.

Similarly, the frequency of observed type is recorded as "preliminary" in the table at 515 and "calculating" in the subsequent tables at 525, 535, 545, 555, and 565, to illustrate that the frequency of observed type may be continuously updated over many runs of a program to provide more accurate data. For example, there may be instances where a particular variable (or object property or array element) gets a particular data type a great majority of the time, but gets a different type state periodically or rarely. That is, a variable could get an integer a majority of the time and a string only rarely. When the frequency of observed type is measured and recorded over a single run of the program and then across multiple runs, the VM can better determine the frequency of observed type on a global basis. For example, if, over a single run of a program, a particular variable gets an integer 90% of the time, and gets a string 10% of the time, the VM has some indication of how rare the string type is for the variable. Over subsequent runs, though, the frequency of observed type can be measured and show that, in fact, the over multiple runs, the particular global variable only gets a string 1% or 2% of the time, despite the initial calculation in the first run that the frequency of "string" was much higher (i.e., 10%). It is contemplated that the frequency of observed type may be stored as numerical calculations, formulas, ratios, percentages, or tables, even though the table depicts the characterization of the frequency in general terms such as "preliminary" and "calculating." Frequency of observed type may be characterized, calculated, assessed, or recorded using specific measurements, or be described by any kind of technical or lay terms.

Frequency of observed type, as well as other type-state-related data, may be communicated to an optimization level determination component 511, such as the optimization level determination component 111 of the compiler/interpreter engine 110 depicted in FIG. 1. The optimization level determination component 511 may determine, among other things, how highly to optimize code and when to not use optimized code. As an example of how the optimization level determination component 511 may utilize type-state-related data to make such determinations, the frequency of observed type may indicate, as in the present example, that a particular variable gets an integer 99% of the time, and gets a string 1% of the time. The optimization level determination component 511 may determine that highly optimized code should be used, wherein the assumption for that particular variable is an integer. In the 1% of cases where the variable gets a string, the VM can used non-optimized code. The code is characterized as "highly optimized" because even though the global data type for that particular variable is technically "integer or string," the optimized code can be more efficient by assuming a narrower type state of "integer." Such an advantageous assumption can be made because the frequency of observed type is known. In this example, during the 1% of occasions that the optimized code is incorrect, and the particular variable gets a string, the compiler/interpreter engine 110 can be instructed to use non-optimized code. This instruction may be accomplished by the run-time type checking component 114 or other components of the VM 104. A run-time type check may, in the 1% of occasions, instruct the VM to use non-optimized code in contrast to deoptimizing, (i.e., throwing out the optimized code based on the assumption of var=integer), which can be a more effective use of processing resources and result in better program execution. The frequency of observed type can be used to calculate whether such a non-optimization instruction would be worthwhile. For example, if for a particular variable, the data type is an integer 50% of the time and a string 50% of the time, it may be more worthwhile, in comparison to the 99%/1% example, to have "less optimized" code that assumed "var=integer or string." That is, "highly" optimized code that assumes "var=integer," plus a run-time instruction to use non-optimized code 50% of the time when "var=string," might not be very efficient.

Though the tables 515, 525, 535, 545, 555, and 565 show four distinct items of type-state-related data, it is contemplated that more or fewer heuristics of a program could be recorded in the context-free type data program for the purposes of providing information to the optimization level determination component 511.

Turning now to FIG. 6, shown are three sample blocks of computer code according to embodiments of the present disclosure. The first block of code 620 shows how aspects of the present disclosure may be implemented when the global data type to be recorded is specific to the values and data types of global variables or global properties. The second block of code 630 shows how aspects of the present disclosure may be implemented when the global data type to be recorded is specific to the values and data types of object properties. The third block of code 640 shows how aspects of the present disclosure may be implemented when the context-free type data to be recorded is specific to the values and data types of array elements. It is contemplated that global data types may also be recorded for other named memory locations in embodiments not depicted here, including, but not limited to, polymorphic object property access sites.

The first block of code 620 shows how a data type for a particular property or variable "gbl" may be encountered in source code, appear in corresponding optimized code, then type-checked by the optimized code, and stored into the context-free type state recorder. In this example, a context-free type state recorder 621 in communication with the VM running the first block of code 620 has stored information that "gbl" is a string. The context-free type state recorder 621 may have obtained this global data type information from a previous run of this program on the same VM, or it may have received it from another VM that recorded the context-free data and transferred it to the present VM.

Line 601 represents a line of source code written in a dynamically-typed language. The example at line 601 is written in the JavaScript® scripting language. Because the currently recorded data type for "gbl" is a string, every time that "gbl" appears in the source code, it may be checked to identify or verify that its data type is still a string. In the example at line 601, in source code, "gbl=unknown_value." Instructions 602-605 represent optimized code that can check whether "unknown_value" is a string. The examples at instructions 602-605 are written in assembly language. At instruction 605, the code contains an instruction to deoptimize if the type of "unknown_value" is not a string. Instruction 606 represents an instruction to store the value into the cell representing "gbl." That is, instruction 606 records the value or data type of "unknown value" into the context-free type state recorder 621. If the data type of "unknown_value" is a string, the global data type recorded will remain the same. If the data type of "unknown_value" is not a string, the global data type recorded will be updated.

The second block of code 630 shows how the global data type for a particular object property may be encountered in source code, appear in corresponding optimized code, then type-checked by the optimized code, and stored into the context-free type state recorder. The example shown assumes that a particular constructor "C" in source code creates objects with the following properties: x: integer, y: string, z: object. In the second block of code 630, line 607 represents a line of source code that would appear and require a run-time type check. Line 607 is written in the JavaScript® scripting language. The context-free type state recorder 631 has recorded that "c_obj.x=integer," either from a previous program run on the VM or from transferred context-free type data. Instructions 608 and 609, which represent optimized code written in assembly language, check that the data type of c_obj.x is actually an integer, with instructions to deoptimize if it is not. Instruction 610, which can also be part of the optimized code, stores the value of c_obj.x into the context-free type state recorder 631 and updates the data type if necessary.

The third block of code 640 shows that a data type for all the elements of a particular array may be encountered in a particular line of source code, appear in corresponding optimized code, then type-checked by the optimized code, and stored into the context-free type state recorder. The example shown assumes that arrays allocated at a particular position in the source program, which in this case is arbitrarily assigned line 1000, have elements that are all of a particular data type. This type is recorded in a context-free type state recorder 641, which is "integer." The information stored in the context-free type state recorder may appear as "arr @ line 1000=integer." This recorded type state info, again, may be recorded from previous runs of the program on the same VM or transferred via non-volatile memory from another VM. Line 611 represents a line in source code that would require a run-time type check of arr[10]. Assuming that other necessary checks have taken place, such as that an is an array of integers and 10 is in bounds, instructions 612 and 613 represent optimized code (written in assembly language) that would check the type of unknown_value. If it is not an integer, the code would deoptimize, and the new type would be recorded in the context-free type state recorder for arrays allocated at line 1000. If it is an integer, then instruction 614 stores unknown_value into the memory location arr[10]. In this particular example, every array has an internal marker (not shown) which indicates where it was originally allocated in the source code. An example of an internal marker is an "allocation memento" as used in a V8 JavaScript Engine. An allocation memento is a block of memory allocated adjacent to the array at the same time as the array. Other compiler/interpreter engines may use different terminology to mark the locations of particular arrays. An allocation memento works by pointing to an allocation site object. Such an object may contain context-specific meta-data, which may include data types for array elements at that location. In embodiments of the present disclosure, a context-free version of the meta-data may be recorded in a table. Over multiple runs of a program, the allocation memento (or other similar internal marker) may be used to locate and record any updated global data type information for array elements in their particular locations within the source code. Though the specific location of the array element in the source code is identified and recorded, the recording is still "context-free" because the recorded global type state data does not point to a particular object.

In the examples of FIG. 6, run-time type checks were performed by, and were part of, the optimized code itself. It is contemplated, though, that run-time type checks may be implemented in non-optimized code or by other aspects of the VM 104 itself. To illustrate this concept, the run-time type checking component 114 (referring briefly back to FIG. 1) is depicted as a component that may be part of the compiler/interpreter engine 110 or the VM 104 itself.

Figure 7:
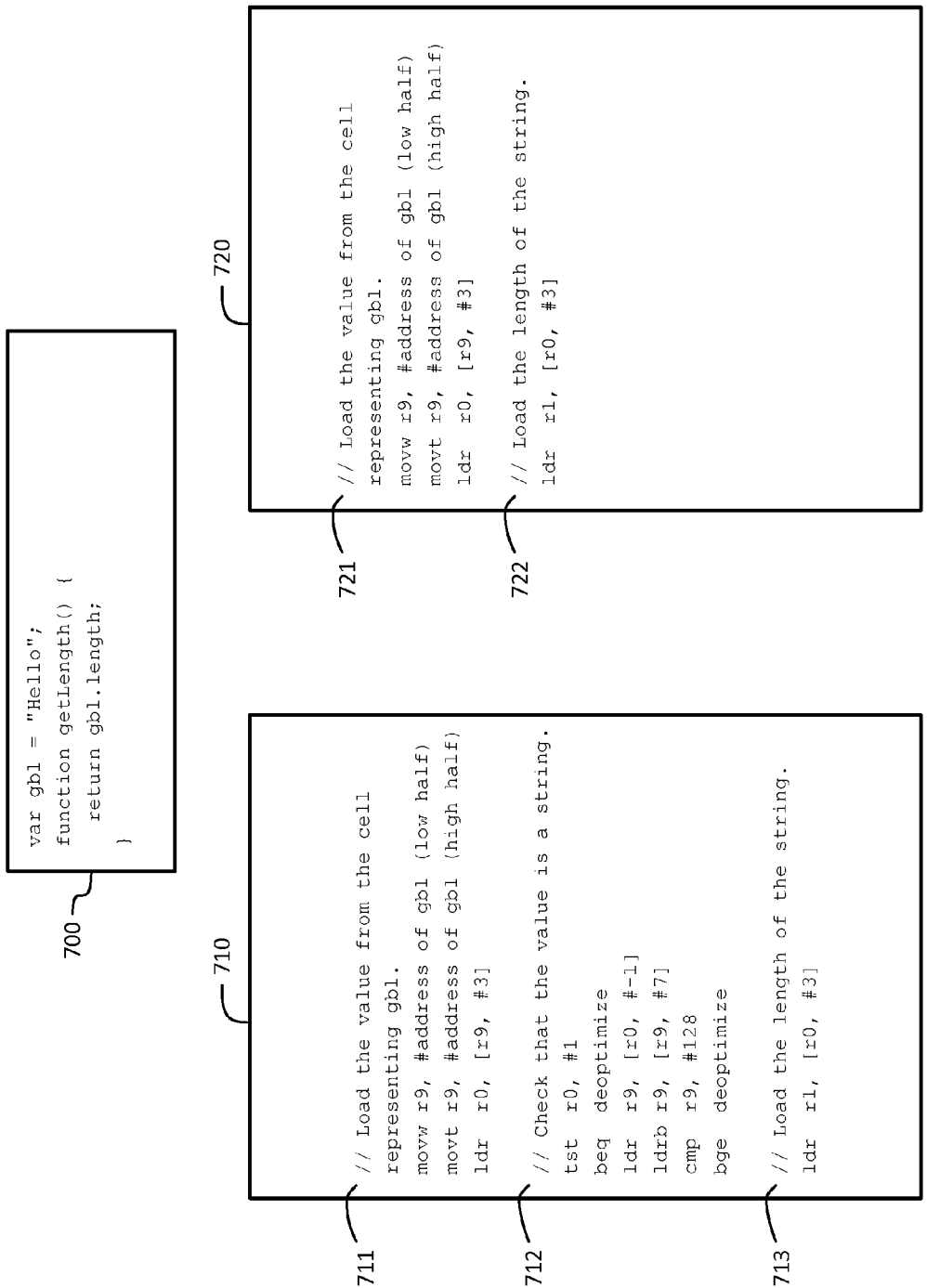
FIG. 7 depicts how optimized code may appear according to an aspect of the disclosure.

In FIGS. 6 and 7, two different types of run-time type checks are shown. The first type of type check can be characterized as a type check for the purpose of identifying a data type, in instances where the data type is unknown because it has not been recorded or in instances where the data type may change. For example, a data type may be initially unknown, and the identifying type-check will perform the operation of identifying and storing the data type. In FIG. 6, in first block 620, at instruction 605, this first particular run-time type check is performed in order to find out what the data type of the value being stored into gbl is, so that it may be recorded in the context-free type state recorder 621. A second type of type check may be characterized as a type check for the purpose of verifying a data type. Because of global type state recording (context-specific, as in prior implementations, or context-free, as in the present disclosure) in many cases, a verifying type check can be eliminated. Context-free type recording propagates type state information across multiple runs of a program, indicating whether it is safe to eliminate a check, reducing the risk of deoptimization. The elimination of a verifying type check is explained further with reference to FIG. 7. It is contemplated that some type checks may perform both functions of identifying and verifying type data, and that some of those type checks may not be completely eliminated.

FIG. 7 shows an instruction in source code and two examples of optimized code, one of which contains a verifying run-time type check and one of which does not. The block of source code 700 shows code written in JavaScript where the type state of the variable "gbl" is a string. It is followed by a function that returns the length of the string in "var gbl," which requires that "var gbl" is actually a string. This particular length property is stored at the same offset for all strings. However, there may be other non-string objects throughout the source code that may have "length" properties at other offsets. In order to ensure that this particular length function for gbl, which returns the length of a string, actually works, var gbl must actually be a string. In prior art VMs, the verification would be accomplished by a verifying run-time type check. However, if the data type for var gbl is recorded in the context-free type state recorder, its data type (i.e., string) can be loaded and the run-time type check can be eliminated.

In the first block of code 710, the instruction 711 loads the value from the cell representing gbl. That is, instruction 711 loads a pointer to a string object out of the cell into a temporary register. Next, the instruction 712 performs a verifying run-time type check to ensure that the loaded value is actually a string (based on previously observed data type). Then, the instruction 713 loads the length of the string. Instruction 713 can operate on the value in the temporary register because it definitely knows the value is a string, based on the verifying type check. However, because the data type for gbl is recorded in the context-free type state recorder, the instruction 712 verifying type check is actually unnecessary. That is, because of the load operation, rather than the store operation shown in FIG. 6, the data type, once loaded, cannot change, and therefore does not need to be checked. Instead, the optimized code can look like the second block of code 720, which has the instruction 721 to load the value of gbl, omits the type check, and proceeds to instruction 722 to load the length of the string.

It is contemplated that run-time type checks in code may be eliminated, based on recorded data types, in places throughout the program that cannot deviate once a global data type is known. For example, in FIG. 7, when the global data type is recorded and then loaded (at instruction 711), the VM may assume that the data type is a string without checking, because the load cannot change the data type. The VM may also assume that the string length is an integer, because string lengths are always integers. In contrast, identifying run-time type checks may not often be eliminated even though the data type for a particular variable may have been previously recorded. For example, in the first block of code 620 in FIG. 6, the data type ("string") of "unknown_value" for the variable gbl must be checked and then stored at instruction 606. This identifying type check could identify a change in the global data type for the variable gbl. Therefore, the identifying type check is necessary because if the data type for this instance of gbl is not a string, other assumptions in the code that assume gbl is a string could be broken.

It is contemplated that identifying type checks may be used when data types need to be stored and may change. Verifying type checks may be eliminated in many instances when the data type is recorded, accurate, and loaded from the context-free type recorder. In sum, recording global type state information may make certain run-time type checks cheaper and may eliminate certain other run-time type checks completely. The streamlining or elimination of various type checks may be determined in part by the volatility of a program overall or by the volatility of a particular named memory location. That is, it may be desirable to streamline or eliminate certain type checks only once the volatility has been determined to be low.

Figure 8:
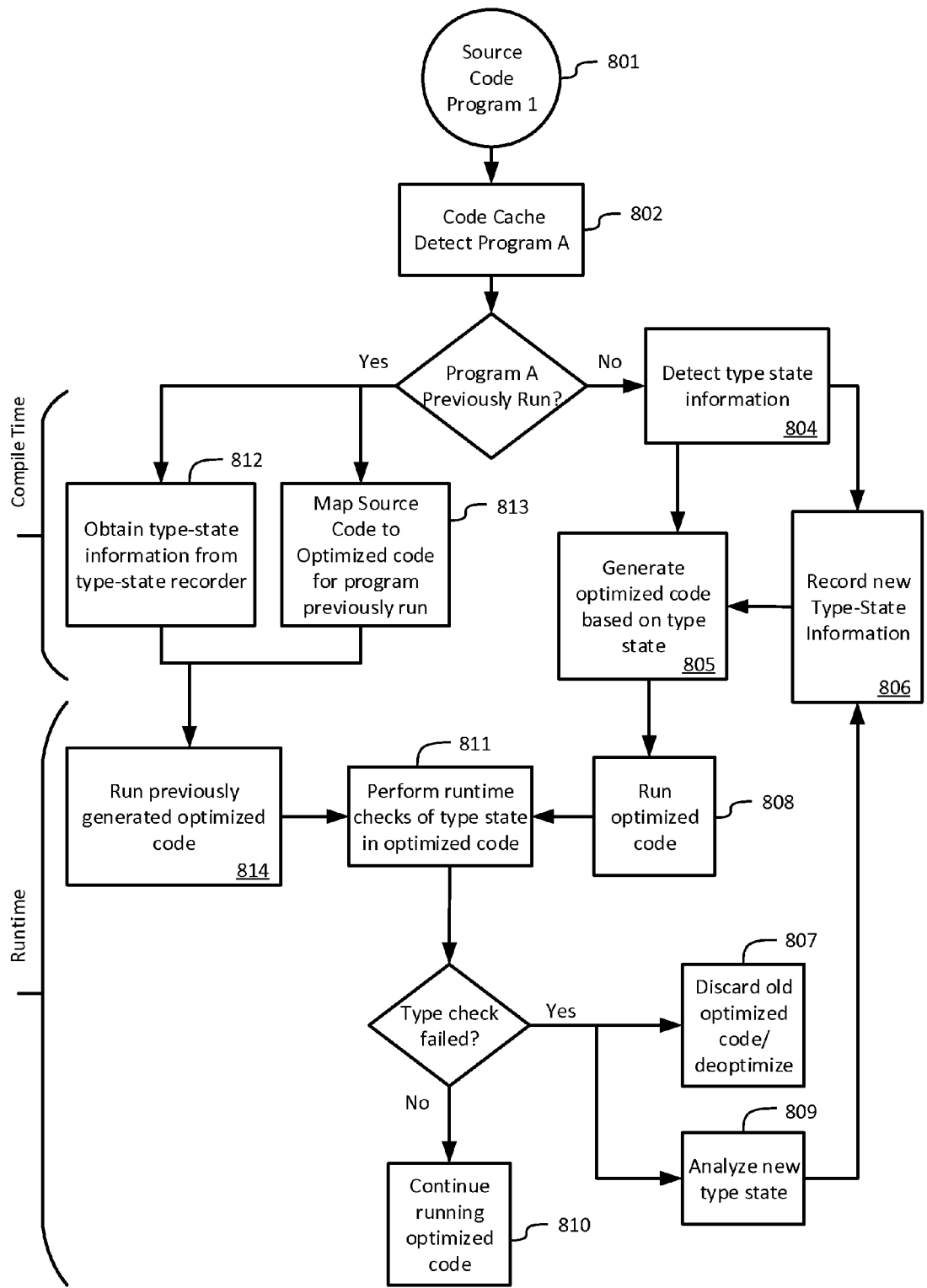
FIG. 8 is a flowchart depicting methods that may be traversed according to aspects of the disclosure.

FIG. 8 shows a flowchart of a method which may be traversed according to embodiments of this disclosure. This method may be performed via components illustrated in FIG. 1, and therefore, simultaneous reference may be made to FIGS. 8 and 1. First a source code of a program 1 (Block 801) may be provided to the VM 104. Then the code cache 116 and program detection component 117 may detect whether the source code has been run before. If the program has not been run before, the compiler/interpreter engine 110 may detect type state information (Block 804). As the compiler/interpreter 110 detects the type state information, it may record new type state information (Block 806) at the context-free type state recorder 120. The compiler/interpreter engine 110 may also generate optimized code based on the type state information (Block 805) via the optimized code generation component 112. The recording (Block 806) and generating (Block 805) may occur simultaneously or sequentially, and may be repeated. Then the VM 104 runs the generated optimized code (Block 808). During the running of optimized code, the VM 104 may perform run-time type checks (Block 811) via the run-time type checking component 114. If the type check does not fail, the VM 104 continues running the optimized code (Block 810). If the type check does fail, the VM 104 can discard old optimized code (i.e., deoptimize) (Block 807) via the deoptimization component 115. The compiler/interpreter engine 110 may also analyze the new type state information (Block 809). The deoptimization (Block 807) and analysis of the new type state (Block 809) may take place simultaneously or sequentially. Then, the context-free type state recorder 120 records new type state information (Block 806.) Based on this new type state information, the optimized code generation component 112 generates new optimized code (Block 805). Other aspects of the method may then be repeated.

If the code cache 116 and the program detection component 117 detect (Block 802) that the source code 106 had been previously run, then the VM 104 may map the source code to optimized code for the previously run program (Block 813) stored in the code cache 116. The VM 104 may also obtain type state information previously recorded at the context-free type state recorder 120 (Block 812). The mapping (Block 813) and obtaining (Block 812) may take place simultaneously or in sequence. Then the VM 104 may run the previously generated optimized code (Block 814). The VM 104, via the run-time type checking component 114 may then perform run-time type checks (Block 811). The other aspects of the method may then be performed as indicated in the flowchart.

Figure 9:
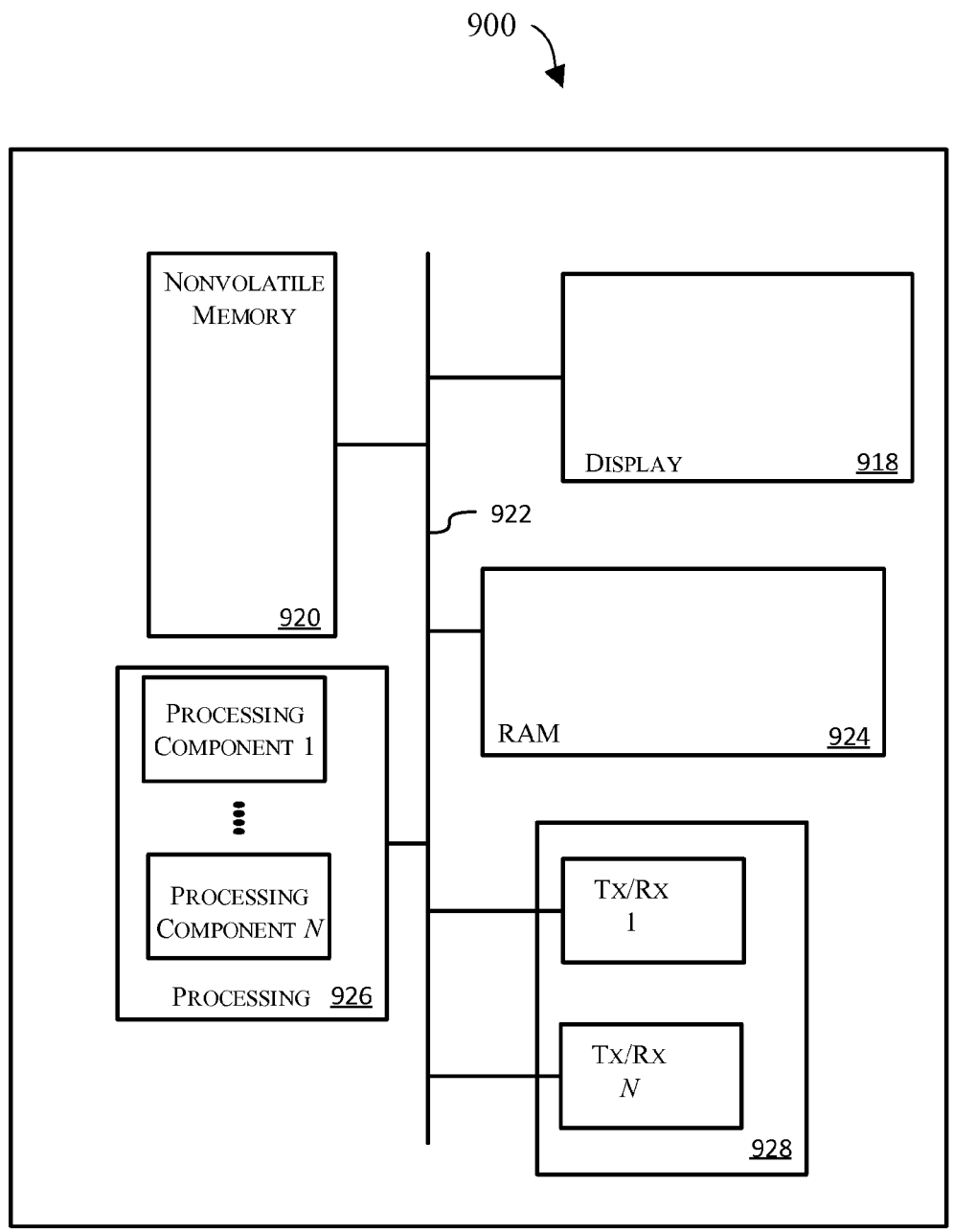
FIG. 9 is a functional block diagram depicting computer hardware upon which components depicted in FIG. 1 may be implemented, according to aspects of the disclosure.

The systems and methods described herein can be implemented in a computer system in addition to the specific physical devices described herein. FIG. 9 shows a diagrammatic representation of one embodiment of a computer system 900 within which a set of instructions can execute for causing a device to perform or execute any one or more of the aspects and/or methodologies of the present disclosure. The methods in FIG. 8 are examples of the implementation of the computer system 900. The components in FIG. 9 are examples only and do not limit the scope of use or functionality of any hardware, software, firmware, embedded logic component, or a combination of two or more such components implementing particular embodiments of this disclosure. Some or all of the illustrated components can be part of the computer system 900. For instance, the computer system 900 can be a general purpose computer (e.g., a laptop computer) or an embedded logic device (e.g., an FPGA), to name just two non-limiting examples.

The various illustrative logical blocks, modules, and circuits described in connection with the embodiments disclosed herein (e.g., the compiler/interpreter engine 110, the optimization level determination component 111, the optimized code generation component 112, the non-optimized code generation component 113, the run-time type-checking component 114, and the deoptimization component 115) may be implemented or performed with a processing component 926, which may be one or more of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory 924, non-volatile memory 920 such as flash memory, ROM memory, EPROM memory, EEPROM memory, registers, hard disk, a removable disk, a CD-ROM, or any other form of storage medium known in the art. The various illustrative logical blocks, modules, and circuits described in connection with the embodiments disclosed herein (e.g., the code cache 116, and the context-free type state recorder 120) may be implemented or performed with the various storage mediums enumerated herein. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for reducing deoptimization in a virtual machine, the method comprising:
    compiling source code of a dynamically-typed program;
    recording, during runtime, at a context-free type-state recorder in a memory, a first data type of a value associated with a particular named memory location within the source code; wherein the context-free type-state recorder is configured to record all possible data types that may be assigned to the particular named memory location across multiple runs of the dynamically-typed program;
    generating optimized code based on the first data type of the value being a matching data type for global values associated with the particular named memory location;
    type-checking that one or more global values associated with the particular named memory location is of the same type as the first data type;
    recording, during runtime, at the context-free type-state recorder, if one or more of the global values associated with the particular named memory location is a different data type than the first data type, one or more different data types associated with the particular named memory location; and
    generating optimized code based on the first data type and the one or more different data types of the values associated with the particular named memory location being matching data types for global values associated with the particular named memory location.

2. The method of claim 1, further comprising;
    transferring one or more recorded data types associated with the particular named memory location of the source code of the dynamically typed program from a first non-volatile memory associated with the virtual machine to a second non-volatile memory associated one or more other virtual machines.

3. The method of claim 2, further comprising;
    executing the source code of the dynamically-typed program at the one or more other virtual machines;
    generating, at the one or more other virtual machines, optimized code based on the one or more recorded data types associated with the particular named memory location being matching data types for global values associated with the particular named memory location.

4. The method of claim 1, wherein;
    the method is performed within a single execution of the dynamically-typed program.

5. The method of claim 1, wherein;
    the particular named memory location is one of a variable, an object property, an array element, or polymorphic object property access site.

6. The method of claim 1, further comprising;
    recording, at the context-free type-state recorder, other type-state-related data;
    determining, based on the other type-state-related data, a level of optimization of the optimized code dependent on the first data type and a second data type, wherein, the other type-state-related data includes one or more of the group comprising frequency of observed data type, volatility of the program, run length of the program, and kind of program.

7. The method of claim 1, wherein;
    the one or more different data types associated with the particular named memory locations recorded during a first execution of the program are utilized to generate optimized code in subsequent executions of the program when the particular named memory locations in the subsequent executions of the program are differently located because of being associated with different objects or lines of code comprising the program than in the first execution of the program.

8. The method of claim 1, further comprising;
detecting that the source code of the dynamically-typed program has been previously executed on the virtual machine,
storing the optimized code based on the first data type and the one or more different data types,
obtaining, from the context-free type data recorder, the one or more different data types, and
mapping the optimized code to the source code in a subsequent execution of the program.

9. A computing device for running dynamically-typed programming languages, comprising;
a compilation engine for compiling source code of a dynamically-typed program;
a context-free type-state recorder in a memory, configured to record a first data type of one or more values associated with a particular named memory location within the source code during runtime, and further configured to record all possible data types that may be assigned to the particular named memory location across multiple runs of the dynamically-typed program;
an optimized code generation component configured to generate optimized code based on the first data type of the value being a matching data types for global values associated with the particular named memory location; and
a run-time type-checking component for type-checking one or more global values associated with the particular named memory location to determine whether the global values have matching data types to the first data type,
wherein the context-free type-state recorder is further configured to record, during runtime, if one or more of the global values associated with the particular named memory location is a different data type than the first data type, one or more different data types associated with the particular named memory location; and
wherein the optimized code generation component is further configured to generate optimized code based on the first data type and the one or more different data types of the values associated with the particular named memory location being matching data types for global values associated with the particular named memory location.

10. The computing device of claim 9, wherein the memory is a removable non-volatile memory, which stores one or more recorded data types associated with the particular named memory location of the source code, and is transferrable from a first virtual machine to one or more other virtual machines.

11. A non-transitory, tangible computer readable storage medium, encoded with processor readable instructions to perform a method for reducing deoptimization in a virtual machine, the method comprising:
compiling, at a compilation engine, source code of a dynamically-typed program;
recording, during runtime, at a context-free type state recorder in a memory, a first data type of a value associated with a particular named memory location within the source code, wherein the context-free type-state recorder is configured to record all possible data types that may be assigned to the particular named memory location across multiple runs of the dynamically-typed program;

generating optimized code based on the first data type of the value being a matching data type for global values associated with the particular named memory location;
type-checking that one or more global values associated with the particular named memory location is of the same type as the first data type;
recording, during runtime, at the context-free type-state recorder, if one or more of the global values associated with the particular named memory location is a different data type than the first data type, one or more different data types associated with the particular named memory location; and
generating optimized code based on the first data type and the one or more different data types of the values associated with the particular named memory location being matching data types for global values associated with the particular named memory location.

12. The non-transitory, tangible computer readable storage medium of claim 11, wherein the method includes:
transferring one or more recorded data types associated with the particular named memory location of the source code of the dynamically typed program from the virtual machine to one or more other virtual machines.

13. The non-transitory, tangible computer readable storage medium of claim 12, wherein the method includes:
executing the source code of the dynamically-typed program at the one or more other virtual machines;
generating, at the one or more other virtual machines, optimized code based on the one or more recorded data types associated with the particular named memory location being matching data types for global values associated with the particular named memory location.

14. The non-transitory, tangible computer readable storage medium of claim 12, wherein:
the method is performed within a single execution of the dynamically-typed program.

15. The non-transitory, tangible computer readable storage medium of claim 12, wherein:
the particular named memory location is one of a variable, an object property, an array element, or polymorphic object property access site.

16. The non-transitory, tangible computer readable storage medium of claim 12, wherein the method includes:
recording, at the context-free type-state recorder, other type-state-related data;
determining, based on the other type-state-related data, the level of optimization of the optimized code dependent on the first and second data type, wherein,
the type-state-related data includes one or more of the group comprising frequency of observed type, volatility of the program, run length of the program, and kind of program.

17. The non-transitory, tangible computer readable storage medium of claim 12, wherein the method includes:
the one or more different data types associated with the particular named memory locations recorded during a first execution of the program are utilized to generate optimized code in subsequent executions of the program when the particular named memory locations in the subsequent executions of the program are differently located because of being associated with different objects or lines of code comprising the program than in the first execution of the program.

18. The non-transitory, tangible computer readable storage medium of claim 12, wherein the method includes:

detecting that the source code of the dynamically-typed program has been previously executed on the virtual machine, storing, the optimized code based on the first data type and the one or more different data types, obtaining, from the context-free type data recorder, the one or more recorded data types, and mapping the optimized code to the source code in a subsequent execution of the program.

* * * * *